United States Patent Office 2,697,117
Patented Dec. 14, 1954

2,697,117

SULFONATION OF BENZENE

Robert T. Joseph, Richboro, and Percy J. Cole, Philadelphia, Pa., assignors to Allied Chemical & Dye Corporation, New York, N. Y., a corporation of New York No Drawing. Application July 7, 1951,
Serial No. 235,672

2 Claims. (Cl. 260—505)

This invention relates to the preparation of benzene sulfonic acid, and is more particularly concerned with improved procedure for the production of benzene monosulfonic acid.

The prior art is replete with references to various procedures for sulfonating benzene. One of the chief hindrances to smooth and rapid monosulfonation of benzene which prior art procedures recognized and attempted to overcome, is the formation of water as a product of reaction. This gradual accumulation of water in the reaction mixture tends to dilute the sulfuric acid employed as sulfonating agent to such an extent as to materially decrease the rate of reaction between the aromatic hydrocarbon and the sulfuric acid and thus prolong the period of reaction. Another problem often encountered in sulfonations of this type is the tendency of side reactions to take place, with the resulting production of undesired by-products, for example sulfones.

In an effort to solve the problem of water formation, and its attendant retardation of the reaction rate and unsatisfactory yields, it has hitherto been necessary, in the manufacture of the above aromatic sulfonic acids by direct sulfonation of the hydrocarbons with sulfuric acid, to displace the equilibrium in favor of production of the desired sulfonic acid products by removal of water in some manner from the reaction mixture. Thus, for example in U. S. Patents 1,300,228 and 1,300,227 it was proposed to pass benzene or tolune vapors up a tower countercurrent to a stream of sulfuric acid, water and unreacted hydrocarbons escaping from the tower as vapors. Another similar procedure described in U. S. Patents 1,210,725 and 2,225,564 involved passing vapors of benzene or toluene through a body of sulfuric acid and driving off excess hydrocarbons and the water of reaction. Still other types of prior art processes such as those of U. S. Patents 1,279,296 and 1,301,360 proposed vapor phase reaction of benzene and sulfuric acid employing a vacuum either during or subsequent to the reaction period in order to eliminate the water formed. However, all of these vapor phase processes suffer from the standpoint that a major proportion of the power cost charged to the final product arises from the vaporization of benzene, thus placing such processes at an economic disadvantage.

Many liquid phase processes for monosulfantion of benzene have also been proposed. Thus, in U. S. P. 1,247,499 is described a continuous sulfonation procedure involving introduction of aromatic hydrocarbon, e. g. benzene, alone or dissolved in some solvent which may be an excess of benzene itself, into the bottom of a receptacle in countercurrent contact with sulfuric acid. The sulfonated product dissolved in an excess of the benzene or other suitable solvent, flows from an outlet near the top of the receptacle while the sulfuric acid is withdrawn from an outlet in the bottom. Apparently, by operation in such a continnous manner, water formed in the reaction of the patent process is continuously removed in the form of dilute sulfuric acid while fresh concentrated sulfuric acid is continuously supplied to the reaction mixture. U. S. P. 1,213,142 discloses liquid phase sulfonation of benzene under pressure at a temperature up to 130° C. According to the patent, it was necessary to add sulfuric anhydride to the mass during the reaction period in order to remove the water formed in the reaction by conversion of sulfuric acid. It is noted the reaction in this process required upwards of 10 hours for completion. It has also been proposed to produce benzene sulfonic acids containing essentially benzene disulfonic acid by reaction of benzene with high strength 65% oleum while successively elevating the temperature from 70° C. to 250° to 275° and finally to 300° C.

One object of this invention is the preparation of benzene sulfonic acid. A particular aim is the provision of improved procedure for sulfonating benzene rapidly and economically to produce benzene monosulfonic acid in high yield and with minimum formation of side-reaction products such as fulfones. Another object of the invention is to provide a continuous process of the above type. Other objects and advantages will be apparent from the following description of the invention.

We have surprisingly found that the foregoing ends may be accomplished by reacting benzene in the liquid phase with concentrated sulfuric acid at a temperature of about 190–255° C. and a pressure of about 150–500 p. s. i. absolute without removal of water during the reaction. Our experience shows that by practice of the liquid phase process of the invention, the sulfonation reaction proceeds to completion in a comparatively short period of time, e. g. one hour or less, with production of high yields of benzene monosulfonic acid product and practically no formation of side-reaction products. The instant process is considerably more economical than the heretofore practiced vapor phase processes in that no heat is required for vaporization of the benzene. Further, contrary to all prior art teachings, it is remarkable that the highly efficient reaction of the instant process takes place without removal of water from the reaction mixture at any point during the course of the sulfonation reaction. Also, smaller quantities of benzene and sulfuric acid are required in our process than in ordinarily practiced procedures.

In usual practice of the invention process, an excess of benzene is employed, and we have found that an approximately 10% excess of benzene is sufficient. While an excess of up to 150% may be employed, excesses of benzene greater than 10% have no appreciable effect on the reaction and are undesirable for use from an economic viewpoint.

As sulfonating agent in the instant process, we utilize fuming sulfuric acid or oleum of up to 25% strength.

The temperature of the sulfonation reaction described herein is an essential feature of the invention. From development work in this field, we have ascertained that a temperature of 190–255° C. must be maintained in the reaction zone during sulfonation of the benzene.

The reaction of the invention process takes place at superatmospheric pressures in the range of about 150–425 p. s. i. absolute.

One of the chief advantages of the invention process is that the reaction proceeds with great rapidity and without any appreciable retardation toward the end, even though no provision is made for the elimination of the water formed during the reaction. In other words, in our process the formation and presence of water in the reaction mixture has no significant effect in displacing the reaction equilibrium so as to retard production of the benzene sulfonic acid products. Production of high yields of product at outstanding reaction rates without removal of water in accordance with the invention, is highly significant since prior art teachings indicate that satisfactory yields of benzene sulfonic acids can only be produced by removal of water. Moreover, it is believed the presence of water in the reaction of this application probably inhibits formation of by-product sulfones and disulfonic acids, which are produced in only very minor quantity in the invention process, whereas such by-products are generally found in considerably larger quantity in the reaction products of many prior sulfonation processes.

In the instant process, rate of reaction varies with temperature, pressure and concentration of sulfuric acid sulfonating agent. As hereinafter seen, increase in rate of reaction is marked in the presence of sulfur trioxide, i. e. when employing oleum. Generally, the reaction period in commercial operation of our process is not more than about one hour, and often as little as ½ hour may be sufficient. Thus, while the sulfonation process of the invention under certain reaction conditions requires only about ½ hour for completion, as much as 8 hours may be necessary to obtain a product containing about the same amount of sulfoiic acid product by prior art commercial operations involving passage of benzene vapor through sulfuric acid.

In carrying out the sulfonation reaction of the invention, both reactants, that is, benzene and the sulfonating agent, may be added to the reactor, the latter sealed, and the temperature in the reactor raised to the desired point and maintained at this value for the duration of the reaction period. The desired pressure is then built up and maintained within the vessel during the reaction period. In another mode of procedure, one of the reactants, say the benzene, may be gradually introduced under pressure into a reaction zone containing the other reactant, oleum, and the reaction mixture maintained at the desired temperature and pressure during the operation. Further, if desired, both reactants may be simultaneously and continuously introduced under pressure into a body of the hydrocarbon being sulfonated or the sulfonic acid product, and the reaction mixture containing the final sulfonation product removed at the end of the reaction period or intermittently during the reaction. The invention process may be practiced in a fully continuous manner by introducing the benzene and the sulfonating agent simultaneously and continuously under pressure into the reaction zone and continuously removing the reaction product. For a completely continuous process of this type, the use of oleum as sulfonating agent is advantageous because of its great rapidity of reaction with the hydrocarbon.

Yields of products produced by the invention process are much higher than are obtainable by prior art commercial processes, e. g. by passing benzene vapors through sulfuric acid, over the same period of time. Stated in another way, high yields comparable to those of certain known commercial processes may be realized by practice of the instant process employing a much shorter reaction period.

The reaction mixture resulting from the sulfonation process of the invention may contain as much as 95% or more (dry basis) benzene monosulfonic acid, and generally from about 80–95% of such sulfonic acid product. The reaction mixture also usually contains excess benzene or sulfuric acid, in addition to water, and may also include a very small amount of by-product sulfones and disulfonic acids. Under ordinary conditions, the reaction product of our process contains substantially less than 1% of these by-products. The benzene monosulfonic acid product may be recovered from the reaction mixture in any suitable manner.

The following example serves to illustrate the invention, all quantities being expressed in parts by weight:

*Example.*—A series of runs on the sulfonation of benzene were made in accordance with the principles of the invention. In these runs, accurately weighed amounts of the benzene and the sulfonating agent were charged to a reactor. The reactor was then placed in a thermostatically controlled oven or oil bath at the desired reaction temperature, the pressure in the reactor built up to the desired point and the reactor gently agitated. On completion of the reaction, the reactor was allowed to cool to room temperature and was then chilled in ice water before being opened for analysis. At no time during the reaction period was any water withdrawn from the reactor or the sulfonating agent refortified with strong sulfuric acid or oleum to offset dilution.

Data thus obtained on benzene sulfonation are set forth in Table 1 below, amounts of aromatic sulfonic acids in the products being expressed in weight percent calculated on the dry basis.

Table 1

| Run | Time of Heating | Temp., °C. | Pressure, p. s. i. Absolute | Percent Excess Benzene | 20% Oleum, Analysis of Product | |
|---|---|---|---|---|---|---|
| | | | | | Percent Benzene Mono-Sulfonic Acid | Percent Sulfones |
| 1 | 5 min | 200 | 200 | 50 | 87 | 0.0 |
| 2 | 10 min | 225 | 350 | 50 | 91 | 0.0 |
| 3 | 30 min | 240 | 400 | 50 | 94 | 0.0 |
| 4 | 1 min | 250 | 420 | 50 | 94 | 0.0 |
| 5 | 5 min | 250 | 420 | 50 | 94 | 0.0 |
| 6 | ¼ hr | 250 | 420 | 10 | 95 | 0.0 |
| 7 | ½ hr | 250 | 420 | 10 | 94 | 0.3 |

In run 7 it is noted that at 250° C. and 420 P. s. i. using 20% oleum as sulfonating agent, the product contained 94% of benzene mono sulfonic acid. Moreover, in runs 4 and 5, carried out under the same temperature and pressure as run 7 using 20% oleum as sulfonating agent, a product containing 94% benzene monosulfonic acid was formed in as short a reaction period as 1 to 5 minutes.

It is also significant that practically no by-product sulfones were produced in the runs of Table 1 carried out in accordance with the invention.

Particularly from the results of the above example, it is evident that we have developed a remarkably rapid and efficient procedure for monosulfonating benzene in high yield.

Since various changes and modifications may be made in the invention without departing from the spirit thereof, the invention is to be taken as limited only by the scope of the appended claims.

We claim:

1. The improved process for the rapid production of benzene monosulfonic acid which comprises heating benzene and oleum of up to 25% strength in the liquid phase at a temperature of about 190–255° C. and a pressure of about 150–425 p. s. i. absolute for a period of not more than about one half hour without removal of water during the reaction and recovering said benzene monosulfonic acid in high yield as product.

2. The improved process for the rapid production of benzene monosulfonic acid which comprises heating benzene and oleum of up to about 25% strength in the liquid phase at temperatures between about 225° C. and about 250° C. and pressures between about 350 p. s. i. and about 425 p. s. i absolute, for a period of not more than about one half hour, without removal of water during the reaction and recovering said benzene monosulfonic acid in high yield as product.

References Cited in the file of this patent

UNITED STATES PATENTS

| Number | Name | Date |
|---|---|---|
| 1,247,499 | Bull | Nov. 20, 1917 |
| 1,260,852 | Alysworth | Mar. 26, 1918 |
| 1,547,186 | Weiss | July 28, 1925 |
| 1,970,556 | Carswell | Aug. 21, 1934 |
| 1,999,955 | Carr et al. | Apr. 30, 1935 |
| 2,362,612 | Brown | Nov. 14, 1944 |

OTHER REFERENCES

Spryskov: Chem. Abs., vol. 43 page 2178 (1949).